J. H. CONNELLY.

Combined Lamp Chimney and Shade.

No. 56,010.

Patented July 3, 1866.

UNITED STATES PATENT OFFICE.

JOSEPH H. CONNELLY, OF WHEELING, WEST VIRGINIA.

COMBINED LAMP CHIMNEY AND SHADE.

Specification forming part of Letters Patent No. 56,010, dated July 3, 1866.

*To all whom it may concern:*

Be it known that I, JOSEPH H. CONNELLY, of Wheeling, in the county of Ohio and State of West Virginia, have invented a new and Improved Lamp Chimney and Shade; and I do hereby declare that the following is a full, clear, and exact description thereof, which will enable those skilled in the art to make and use the same, reference being had to the accompanying drawings, forming part of this specification, in which—

Figure 1:
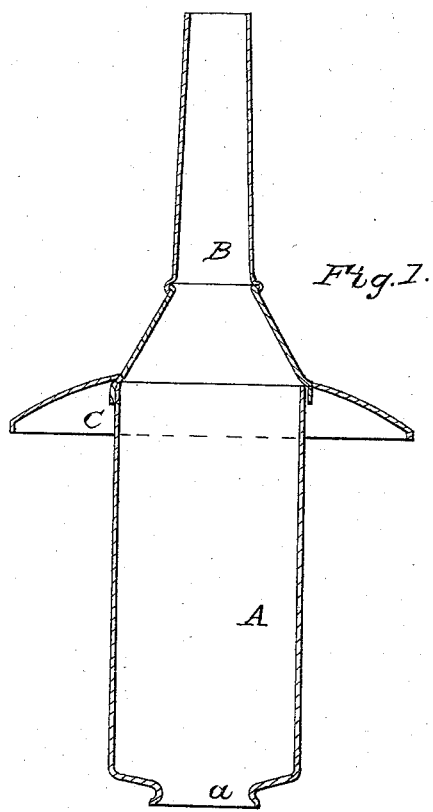
Figure 2:
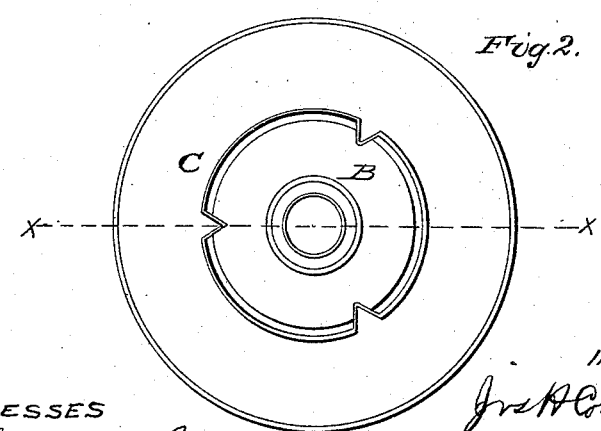

Figure 1 is a vertical central section of my invention, taken in the line $x\ x$, Fig. 2; Fig. 2, a plan or top view of the same.

Similar letters of reference indicate corresponding parts.

The object of this invention is to obtain a chimney for lamps which will not be liable to break or fracture under the heat of the flame, and which will afford a good draft, so that the flame of the lamp will be copiously supplied with oxygen to support proper combustion and at the same time admit of a shade being applied to the chimney without the liability of fracturing it.

The ordinary glass chimneys for lamps are liable to break from two causes: first, the intense heat to which they are subjected and the unequal expansion of the chimney under said heat; and, second, in the application of a shade or reflector, which hitherto has been provided with a clasp to rest on the chimney, and either retarding or resisting its expansion by weight or pressure, or by being applied when the chimney is hot, serving to check or fracture it by sudden contraction, whereby the clasp rests upon it. These difficulties, it is believed, are fully obviated by my invention.

A represents the lower and glass portion of my improved chimney, which is of cylindrical form and of equal diameter its entire length, with the exception of its lower end, which is formed with a neck, $a$, to fit on the lamp-burner, as usual. In consequence of having the part A of equal diameter throughout, it will be heated equally at all parts, or nearly so, and it will be at every point sufficiently far from the flame to avoid the latter coming in contact with it. The ordinary glass chimneys, in consequence of being contracted at their upper part, heat sooner and much more intensely at their upper than at their lower part, and are very liable to fracture from that cause—a difficulty which is obviated by my invention.

B represents a metal top, which is fitted on the upper end of the glass part A. This top may be of any desired shape or form; and C is a shade, which is constructed of sheet metal and of concave form. This shade may rest directly on the metal top B, or on wires or rods attached thereto; but it should not touch the glass part A of the chimney at any point, nor should it rest in contact with any larger surface of the metal top B than is necessary for its support. It is thus kept from heating and affords space for the circulation of air between it and the chimney. This shade C, in consequence of being kept free from the glass part A, may be applied to the chimney at any time without danger of fracturing the same.

The chimney and shade may be constructed at a reasonable cost, and the great expense attending the breaking of chimneys from the causes specified will be avoided. In burning coal-oil the expense attending the breaking of chimneys is frequently nearly equal to the cost of the oil itself.

Having thus described my invention, I claim as new and desire to secure by Letters Patent—

The combination, with the glass chimney A and metal top B, of the shade or reflector C, when provided with supporting-points $c\ c\ c$, and otherwise constructed and applied, as herein specified, to leave an air-space between it and the chimney, lessen the conduction of heat, permit its ready removal, and avoid confining the glass, substantially as set forth.

JOSEPH H. CONNELLY.

Witnesses:
  WM. R. DOWNING,
  A. N. JOHNSTON,
  JOSEPH FORD.